United States Patent [19]

Holt

[11] Patent Number: 4,634,151
[45] Date of Patent: Jan. 6, 1987

[54] GLAD HAND EXTENSION

[76] Inventor: Joseph C. Holt, 1003 Gray St., Veedersburg, Ind. 14233

[21] Appl. No.: 796,873

[22] Filed: Nov. 12, 1985

[51] Int. Cl.⁴ .............................................. F16L 35/00
[52] U.S. Cl. ........................................ 285/38; 285/68;
285/115; 285/116; 16/114 R
[58] Field of Search ........................ 285/68, 69, 70, 71,
285/72, 73, 74, 75, 76, 77, 78, 79, 38, 114, 419,
115, 116; 16/114 R, DIG. 24, DIG. 25; 403/17,
18

[56] References Cited

U.S. PATENT DOCUMENTS

| 392,355 | 11/1888 | McElroy | 285/38 |
| 449,789 | 4/1891 | Wright | 285/73 |
| 701,305 | 6/1902 | Daughtry | 16/114 R |
| 790,685 | 5/1905 | Hendricks | 285/38 |
| 1,063,755 | 6/1913 | Westinghouse | 285/68 |
| 1,118,107 | 11/1914 | Clasen | 285/69 |
| 1,330,983 | 2/1920 | Longo | 285/38 |
| 3,072,955 | 1/1963 | Mitchell | 16/114 R |
| 4,094,535 | 6/1978 | Minton | 285/114 |

FOREIGN PATENT DOCUMENTS

| 23148 | 7/1930 | Australia | 285/68 |
| 706347 | 3/1954 | United Kingdom | 285/114 |
| 1212087 | 11/1970 | United Kingdom | 285/69 |

Primary Examiner—Cornelius J. Husar
Assistant Examiner—Anthony Knight
Attorney, Agent, or Firm—Barnes & Thornburg

[57] ABSTRACT

A handle is disclosed for use in conjunction with a rotatable interlocking coupling on the end of an air line of a brake system. The coupling conventionally has a laterally facing surface including a central opening for communication with a similar coupling, a forwardly projecting tongue on a distal end thereof, a shoulder situated on a proximal end thereof including a rearwardly facing opening for communication with the air line, and a flange at least partially overlying the laterally facing surface defining a tongue-receiving slot for engaging the tongue of a similar coupling. The handle is illustrated in three different embodiments but in all embodiments the handle has an outer surface sized to be easily grasped by a human hand for facilitating the engagement and disengagement of the laterally facing surface and tongue of the coupling in such a manner as to avoid the application of coupling or uncoupling forces to the air line thereby reducing the incidence of line failure.

13 Claims, 5 Drawing Figures

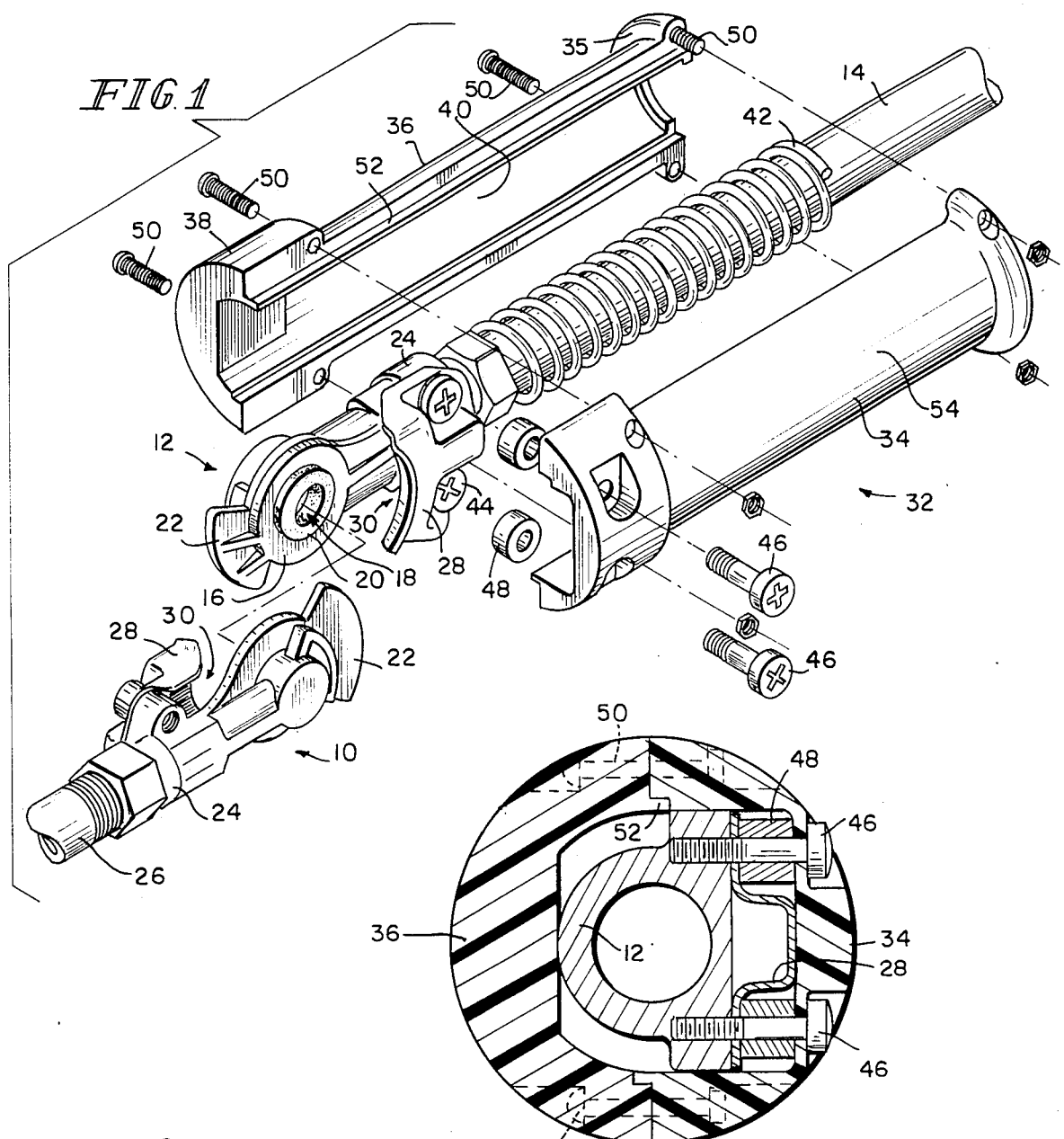

GLAD HAND EXTENSION

The present invention relates generally to couplers for use on air brake systems. The invention particularly relates to an improved coupler which facilitates the connection and disconnection of glad hand type couplers in use on tractors and semitrailers.

Tractors and semitrailers commonly use air brake systems. The brake mechanisms on semitrailers are designed such that the brakes are fully applied when there is no air pressure in the trailer brake line. The trailer brakes are retracted by the presence of air presure within the line which typically achieves a maximum of about 90 to 120 pounds per square inch to fully disengage the trailer brakes. The air hoses from the trailer brake system are coupled to the tractor brake system by means of couplers. Ordinarily, one coupler is rigidly or pivotally connected to the frame of the trailer while a substantially identical coupler is connected to a flexible hose extending from the tractor. The couplers are of a type which rotatably interlock and have a laterally facing surface including a central opening with an elastomeric bushing or gasket which provides a reasonably air-tight communication for the air through the lines. The couplers are secured together by means of a forwardly projecting tongue on each coupler being received between the lateral face and overlying flange on the cooperating coupler. The couplers are engaged and disengaged by a twisting motion substantially in the plane of the laterally facing surfaces through an angle of about 45°. The torque required to couple and uncouple such glad hand type couplers is directly related to the frictional engagment between the meeting bushings or gaskets as well as the meeting tongues and flanges.

The coupling and uncoupling of such glad hand couplers is generally easily accomplished in warm weather. In colder weather, however, and particularly where ice or snow conditions exist, the coupling and uncoupling of such couplers requires a substantially increased torque. This increased torque is often achieved by applying a force to the hose leading from the tractor to the coupler. Particularly, in very cold weather, however, the hose itself becomes brittle and subject to failure. Even in warm weather conditions, the repeated application of a force to the hose rather than directly to the coupler may cause a weakening of the hose-forming material and lead ultimately to hose failure, the failure often occurring while the line is fully pressurized and the truck moving. While a flexible spring has been included to surround the hose immediately adjacent the glad hand coupler in many installations, the flexibility of the spring is such as to not prevent the unwanted hose failure.

In accordance with the present invention, a rigid handle means is provided which projects rearwardly from the tongue-receiving flange of the coupler to facilitate the engagement and disengagement of the glad hand. In particular, the handle means is operable to apply a rotation-inducing coupling torque to the coupler so that a flexible hose leading from the tractor to the coupler is not substantially bent, thereby reducing the incidence of hose failure. The rigid handle means can comprise a longitudinal member enveloping the proximal end of the coupler and an adjacent portion fo the hose to the which the coupler is attached. The handle means can also comprise a hollow longitudinal member having a first end engaged in the rearwardly facing opening of the coupler and a second end including means for engaging a threaded member on the end of a hose. The handle means can also comprise a hollow longitudinal unitary portion of the coupling situated between the flange and the proximal end of the coupler. In each instance, the handle means has an outer surface sized to be easily grasped by the human hand.

The outer surface can also include a polymeric tubular element which may exhibit a color coded to indicate the source to which the hose is attached. The polymeric tubular element can include exterior projections for engagement with the human hand to facilitate manipulation of the connector. The handle means can include a curved portion to angularly offset the direction of the flange-engaging tongue from the axis defined by the distal portion of the handle. Where such an angular offset is employed, it is preferable that the angle be about 45°.

With a coupler constructed in accordance with the present invention, an increased engagement and disengagement torque can be applied to the coupler without applying any force to the adjacent hose. This feature has the advantage of preventing undue wear and tear occurring on the hose, thereby lowering the incidence of brake hose failure. The incorporation of color coded tubular polymeric elements over the handle means of the present invention aids in the identification of the proper line couplings thereby avoiding any possible difficulties arising from improper connection of hoses.

Additional features and advantages of the invention will become apparent to those skilled in the art upon consideration of the following detailed description of several preferred embodiments exemplifying the best mode of carrying out the invention as presently perceived.

The detailed description particularly refers to the accompanying figures in which:

FIG. 1 shows an exploded perspective view of one embodiment of the present invention to be attached to a conventional glad hand coupler.

FIG. 2 is a sectional view of the invention shown in FIG. 1.

FIG. 3 is a side elevation view with sectional detail showing a second embodiment of the present invention.

Figure 4:
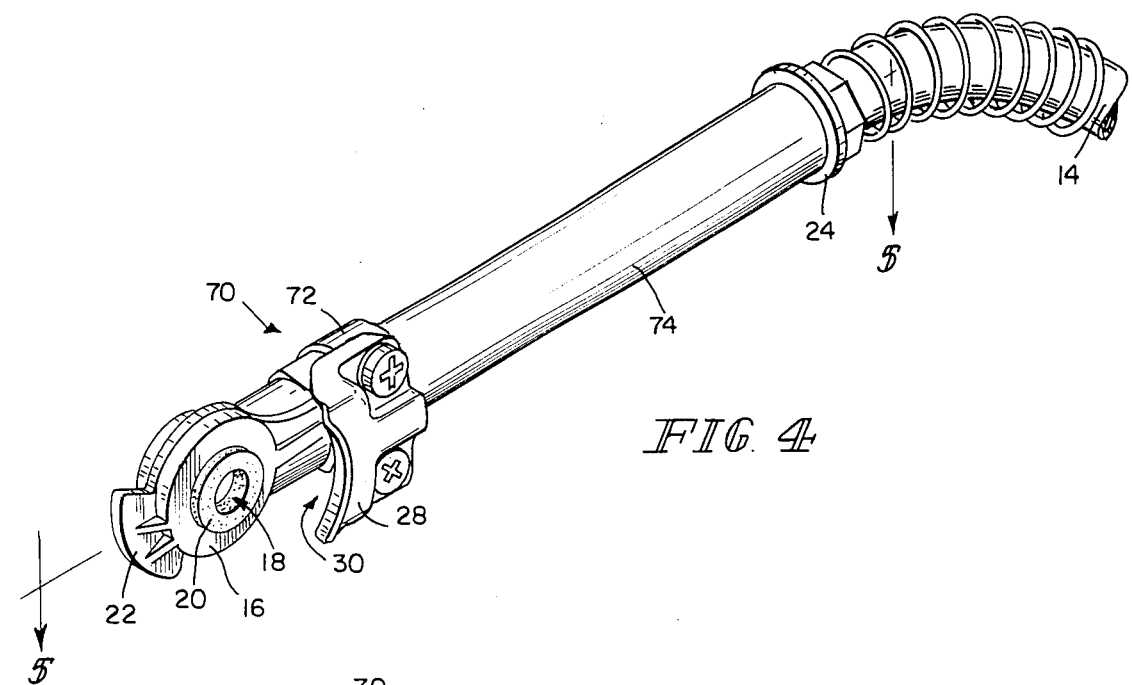
FIG. 4 is a perspective view of a third embodiment of the present invention.

Two prior art glad hand type couplings are illustrated in FIG. 1. Coupler 10 may be considered as the coupler connected to a semitrailer while coupler 12 can be considered as the coupler connected to a tractor by means of hose 14. The couplers 10 and 12 are rotatably interlockable and substantially similar to each other, each having a laterally facing surface 16 including a central opening 18 which is lines with a gasket or grommet 20. A tongue 22 projects forwardly from a distal end of the coupling. A shoulder 24 is situated on a proximal end of the coupler and includes a rearwardly facing opening (not shown) for communication with the adjacent pressure-carrying line. The coupler 12 is shown to be connected to a flexible hose 14 while coupler 10 is shown to be connected to a line 26 forming a part of the frame of a trailer (not shown). The couplings each include a flange 28 which ovelies the laterally facing surface 16 so as to define a tongue receiving slot 30 for receiving the tongue 22 of the cooperating coupler. In particular, coupling member 10 can include a handle means 32 is operable to apply a rotation-inducing torque to interlock the companion coupling members 10-, 12 so that the flexible hose 14 is not substantially bent in response to application of a rotation-inducing force to coupling member 10 to reduce the incidence of hose failure.

A first embodiment of a handle means 32 in accordance with the present invention is shown in FIGS. 1 and 2. The handle means 32 comprises a pair of semicylindrical elements 34 and 36 which are affixed to the flange 28 by means of a plurality of fasteners. The handle means 32 includes a forward shoulder 38 which envelopes shoulder 24 of coupler 12 and a rearward shoulder 35 which defines the proximal end of the handle 32. Each semicylindrical element 34, 36 includes a concave interior surface 40 sized to surround and otherwise enshroud hose 14 and spring 42, if present.

To assemble the handle 32 to an existing coupler 12, it is generally necessary to first remove the existing screws 44 which secure flange 28 to shoulder 24. One of the semicylindrical elements 34 is then secured to the coupler 12 by means of screws 46 which are threaded to be received into the same holes as were previously occupied by screws 44. The screws 46 are necessarily somewhat longer than screws 44 so as to accommodate the material forming the handle means 32. Inasmuch as commerical prior art glad hands vary somewhat in outer dimension, bushings 48 are provided to be positioned between the flange 28 and the interior surface of semicylindrical element 34 as shown in FIG. 2, when necessary.

The mating second semicylindrical element 36 is then secured to the first semicylindrical element by means of fasteners 50 passing through the periphery of shoulders 35 and 38. A linear flange 52 can be included along an inside edge of each center cylindrical element 34, 36 so as to aid in alignment of the two mating portions of handle means 32. The outer surface 54 of the handle means 32 between shoulders 35 and 38 is sized to be easily grasped by a human hand.

The handle means 32 can be composed of any rigid material including high strength plastics. Where the handle 32 is composed of plastic, the color of the plastic may be chosen so as to indicate the type of source to which line 14 is connected.

In a second embodiment shown in FIG. 3, a handle 56 is provided which includes a hollow longitudinal member 58. A first end member 60 is provided which is threadably engaged into the rearwardly facing opening surrounded by flange 24 of coupling 12. A second end member 62 includes an interior thread for engaging the threaded coupling 13 of hose 14. A resilient polymeric tubular element 64 is situated on the outer surface of the coupling between the first end member 60 and second end member 62. Since the handle 56 achieves its rigidity by means of the inherent rigidity of hollow longitudinal member 58, the tubular element 64 may be made of a material which is soft and pliable, thereby enhancing the use of the handle. The tubular element 64 can include projections 66 and indentations 68 which will facilitate the hand manipulation of the coupler.

The first section 60 of the handle 56 is designed to introduce an angle displacement between the longitudinal axis of the coupler 12 and the handle 56. This angular displacement A, shown to be about 45°, permits the hose 14 to be coupled to the trailer in such a manner as to be angularly directed, preferably upwardly, so as to maintain hose 14 in a location of reduced hazard. The angular relationship illustrated with respect to handle 56 can also be adopted for handle 32. Likewise, handle 56 may be fashioned in a linear manner such as handle 32 illustrated in FIG. 1.

Figure 5:
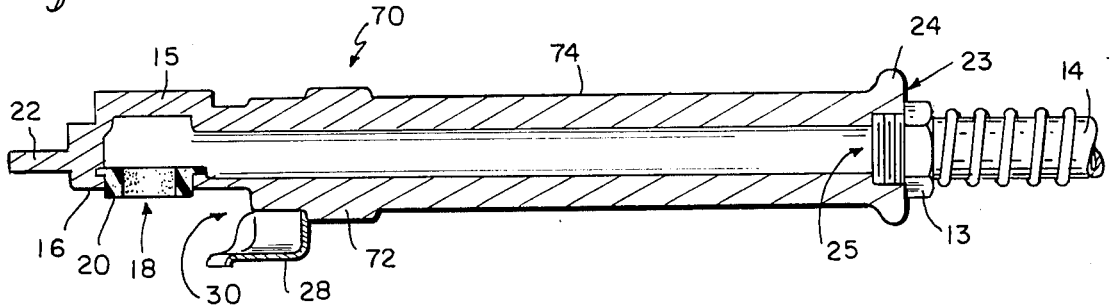
FIG. 5 is a sectional view of the embodiment shown in FIG. 4 taken along lines 5—5.

FIGS. 4 and 5 illustrate a third embodiment of the present invention wherein the handle and coupler are unitarily formed from a cast metal such as aluminum or the like. The coupler 70 includes lateral facing surface 16, central opening 18, and gasket or bushing 20 as in coupler 12. Tongue 22 projects forwardly from the distal end of the coupler while a shoulder 24 is situated on a proximal end thereof. As seen most particularly in FIG. 5, shoulder 24 includes a rearward facing surface 23 with a central openings 25 for communication with threaded coupling 13 of hose 14. Flange 28 is least partially overlies the laterally facing surface 16 is define the tongue receiving slot 30. A forward shoulder 72 is provided on which the flange 28 is mounted. Between the forward shoulder 72 and the proximal shoulder 24 is handle section 74 which is a rigid unitary continuation of the head portion 15 of the coupling. The outer dimension of handle portion 74 is sized so as to be easily grasped by the human hand. A polymeric tubular element similar to that shown in FIG. 3 as 64 may be included if desired. Further, the head portion 15 may be angularly offset from handle portion 74 if desired.

Although the invention has been described in detail with reference to certain preferred embodiments, variations and modifications exist within the scope and spirit of the invention as described and as defined in the following claims.

What is claimed is:

1. A rotatably interlocking coupling for use on an end of a hose of an air brake system, the coupling having a laterally facing surface including a central opening for communication with a similar coupling, a forwardly projecting tongue on a distal end thereof, a shoulder situated on a proximal and thereof including a rearwardly facing opening for communication with the hose, and a flange at least partially overlying the laterally facing surface defining a tongue-receiving slot for engaging the tongue of the similar coupling, the improvement comprising a longitudinal member enveloping the shoulder for enclosing the adjacent portion of the hose, the longitudinal member having an outer surface sized to be easily grasped by a human hand for facilitating the engagement and disengagement of the laterally facing surface and tongue.

2. The coupling of claim 1 wherein the longitudinal member comprises a pair of mating semicylindrical elements.

3. The coupling of claim 2 wherein a first of the pair of semicylindrical elements is fxed to the flange and the second of the pair of elements is secured to the first of the pair.

4. The coupling of claim 1 wherein the polymeric element exhibits a color selected to indicate the source to which said hose is attached.

5. The coupling of claim 1 wherein the polymeric element includes exterior projections for engagement with the human hand to facilitate manipulation of the coupler.

6. A rotatably interlocking coupling for use on an end of a hose of an air brake system, the coupling having a laterally facing surface including a central opening for communication with a similar coupling, a forwardly projecting tongue on a distal end thereof, a should situated on a proximal end thereof including a rearwardly facing opening for communication with the hose, and a flange at least partially overlying the laterally facing surface defining a tongue-receiving slot for engaging the tongue of the similar coupling, the improvement comprising a hollow longitudinal member having a first end engaged in the rearwardly facing opening and a second end including means for engaging a hose, a resilient, polymeric tubular element situated on an outer surface of the hollow longitudinal member between the first and second end for facilitating the engagement and disengagement of the laterally facing surface and tongue, the resilient element having an outer surface sized to be easily grasped by a human hand.

7. The coupling of claim 6 wherein the hollow longitudinal member comprises a unitary portion of the coupling situated between the flange and the shoulder.

8. The coupling of claim 6 further comprising a curved portion for angularly offsetting the direction of the tongue from an axis defined by the hollow longitudinal member.

9. The coupling of claim 8 wherein the angle of offset is about 45°.

10. A handle for use in conjunction with a rotatable interlocking coupling on the end of an air line of a brake system, the coupling having a laterally facing surface including a central opening for communication with a similar coupling, a forwardly projecting tongue on a distal end thereof, a shoulder situated on a proximal end thereof including a rearwardly facing opening for communication with the air line, and a flange at least partially overlying the laterally facing surface defining a tongue-receiving slot for engaging the tongue of a similar coupling, the handle comprising a pair of semicylindrical longitudinal mating elements which together have a first end for enveloping the shoulder and a second end for enclosing an adjacent portion of the air line secured to the rearwardly facing opening, the handle having an outer surface sized to be easily grasped by a human hand for facilitating the engagement and disengagement of the laterally facing surface and tongue of the coupling.

11. An apparatus for reliably coupling the pressurized air supply and air brake system in fluid communication, the apparatus comprising a flexible hose for conducting pressurized air from the pressurized air supply toward a point of use and including a distal air outlet, inflexible coupling means for rigidly interconnecting the distal air outler of the flexible hose and the air brake system in fluid communication, the inflexible coupling means including a pair of rotatably interlocking companion coupling members, one of the coupling members including rigid handle means configured to enshroud an elongated section of the flexible hose adjacent to the distal air outlet for permitting the application of a rotation-inducing torque to unlock or interlock the companion coupling members while the adjacent elongated hose section remains substantially straight during interlocking of the companion coupling members so that the flexible hose does not experience the application of the rotation-inducing force to said one of the coupling members, whereby the incidence of hose failure is reduced.

12. The apparatus of claim 11, wherein each coupling member includes a laterally facing surface having a central opening for communication with its companion coupling member, a forwardly projecting tongue on a distal end thereof, a shoulder situated on a proximal end thereof including a rearwardly facing opening in fluid communication with the flexible hose, and a flange at least partially overlying the laterally facing surface defining a tongue-receiving slot for engaging the tongue of the companion coupling member, and the handle means includes a longitudinal member enveloping the shoulder and extending rearwardly from the flange along the hose, the longitudinal member being configured to provide a grip for a human hand.

13. The apparatus of claim 12, wherein the longitudinal member includes a pair of mating semicylindrical elements.

* * * * *